United States Patent [19]

Calkins

[11] Patent Number: 5,303,510
[45] Date of Patent: Apr. 19, 1994

[54] AUTOMATIC FEED SYSTEM FOR ULTRASONIC MACHINING

[75] Inventor: Noel C. Calkins, Los Alamos, N. Mex.

[73] Assignee: The United States of America as represented by the United States Department of Energy, Washington, D.C.

[21] Appl. No.: 522,016

[22] Filed: May 11, 1990

[51] Int. Cl.⁵ ............................................. B24B 1/04
[52] U.S. Cl. ...................................... 51/59 SS; 51/317
[58] Field of Search ............. 51/59 SS, 59 R, 317; 177/250

[56] References Cited

U.S. PATENT DOCUMENTS

| | | | |
|---|---|---|---|
| 144,286 | 11/1873 | Pickering | 177/250 |
| 2,791,066 | 5/1957 | Mahlmeister | 51/59 SS |
| 4,343,111 | 8/1982 | Inoue | 51/59 SS |

Primary Examiner—Robert A. Rose
Attorney, Agent, or Firm—Richard J. Cordovano; Paul D. Gaetjens; William R. Moser

[57] ABSTRACT

Method and apparatus for ultrasonic machining in which feeding of a tool assembly holding a machining tool toward a workpiece is accomplished automatically. In ultrasonic machining, a tool located just above a workpiece and vibrating in a vertical direction imparts vertical movement to particles of abrasive material which then remove material from the workpiece. The tool does not contact the workpiece. Apparatus for moving the tool assembly vertically is provided such that it operates with a relatively small amount of friction. Adjustable counterbalance means is provided which allows the tool to be immobilized in its vertical travel. A downward force, termed overbalance force, is applied to the tool assembly. The overbalance force causes the tool to move toward the workpiece as material is removed from the workpiece.

7 Claims, 2 Drawing Sheets

AUTOMATIC FEED SYSTEM FOR ULTRASONIC MACHINING

BACKGROUND OF THE INVENTION

This invention relates to the field of machining of materials and, more particularly, to ultrasonic machining and a method of control of ultrasonic machining apparatus. This invention is the result of a contract with the Department of Energy (Contract No. W-7405-ENG-36).

Ultrasonic machining is the removal of material from a workpiece by particles of an abrasive substance which vibrate in a generally vertical direction above and in contact with the workpiece. Movement of the abrasive particles, which are often termed grit, is caused by a tool which oscillates in a vertical direction at about 20,000 Hz, though frequencies up to 40 kHz have been used. The amplitude of the oscillation, or vibration, of the tool is adjustable and may range from less than 0.001 in. to 0.025 in. (0.0254–0.635 mm) with 0.007 in. (0.178 mm) being a typical value. The tool is mounted above but not touching the workpiece and the abrasive particles are in a slurry which is supplied to a gap between the tool and workpiece and flows through the gap.

When a workpiece is stationary, the tool makes a hole in the workpiece having a configuration which is a mirror image of the tool. The tool does not normally rotate and therefore cavities having complex shapes may be machined (though rotating tools have been used in ultrasonic machining).

The accuracy of this machining process depends on factors including the size of the tool, rigidity of the equipment carrying the tool, temperature of the slurry, and size of the abrasive particles. Accuracy of plus or minus 0.001 in. (0.025 mm) can usually be attained and plus or minus 0.0002 in. (0.005 mm) can be achieved with special care. Ultrasonic machining is used primarily on hard and brittle materials, such as ceramics. However, it can be used to machine ductile materials, but with more difficulty. Ultrasonic machining is particularly well suited to the production of relatively shallow irregular cavities and is one of the few machining processes suitable for machining fragile material. The main disadvantages of ultrasonic machining are a low material removal rate and high cost. Thus, it tends to be used only in those applications where other methods of machining fail or produce poor results.

The tool moves in a vertical direction and the vertical gap between the lower face of the tool and the workpiece during machining usually ranges from about 0.0005 to about 0.0025 in. (0.0127–0.0635 mm). It is desirable that the tool be relatively soft but tough. It can be said that the tool captures and throws the grit at the workpiece. Metals that are extremely ductile, such as copper, brass, and aluminum yield a short tool life, while tough materials such as low carbon steel, stainless steels, and molybdenum give good tool life.

The slurry usually contains about 30 to 60% of abrasive by volume in water. Other liquids may be used in place of water, but water is convenient and cheap. The abrasives most used in ultrasonic machining are industrial diamond dust, silicon carbide, boron carbide, and aluminum oxide. Slurry is discharged through a nozzle located adjacent to the cavity being machined in the workpiece. Slurry flowing away from cavity is collected and recycled. It is often necessary to cool the slurry as it picks up a considerable amount of heat. As in conventional grinding, finer abrasives yield smoother finishes, though finer grit usually cuts at a slower speed. Grit sizes from about 200 to about 400 (0.0026–0.0009 in. or 66–23 microns) are used for rough cutting and sizes from about 800 to about 1000 (0.00044–0.00032 in. or 1114 8 microns) are used for finishing. Fresh abrasive cuts better than grit which has been in use for a period of time so grit should be added to the slurry from time to time and the slurry should be completely replaced at intervals. Also, the concentration of material removed from the tool and the workpiece builds up in the slurry.

The speed at which parts can be machined and the quality of the part produced is highly dependent upon the tool feed rate, that is, the rate at which the tool is moved downward toward the workpiece. If the tool feed rate is too rapid, tool wear will be high and the risk of chipping or cracking the brittle workpieces on which ultrasonic machining is used will be great. If the tool contacts the workpiece, there will be damage to both to the extent that both will likely have to be scrapped.

SUMMARY OF THE INVENTION

This invention is a method and apparatus for ultrasonic machining in which feeding of a tool assembly holding a machining tool toward a workpiece is accomplished automatically. In ultrasonic machining, a tool located just above a workpiece and vibrating in a vertical direction imparts vertical movement to particles of abrasive material which then remove material from the workpiece. The tool does not contact the workpiece. Apparatus for moving the tool assembly vertically is provided such that it operates with a relatively small amount of friction. An adjustable counterweight or other counterbalance means is provided which allows the tool to be immobilized, or stopped, in its vertical travel, as a result of balancing the gravitational force on the tool assembly by the upward force due to the counterbalance means. A downward force, termed overbalance force, is then applied to the tool assembly. The overbalance force causes the tool to move toward the workpiece as material is removed from the workpiece.

In a broad embodiment, this invention is a method of ultrasonic machining comprising: providing ultrasonic machining apparatus having an ultrasonic machining tool mounted in a tool assembly and disposed such that said tool assembly is movable in a vertical direction and a relatively small amount of force is required to overcome frictional force associated with vertical movement of said tool assembly; directing a slurry stream comprised of abrasive particles in a liquid to a location on a workpiece from which material is removed by means of said tool and said abrasive particles; providing adjustable counterbalance means effective to immobilize the tool assembly in its vertical travel; and providing a force acting vertically downward on the tool assembly which is effective to cause downward movement of the tool assembly so that the tool is spaced apart from said workpiece by a vertical gap of such size that material is removed from the workpiece, where said downward force is less than a force which would cause the tool to contact the workpiece.

DETAILED DESCRIPTION OF THE INVENTION

This invention provides a method for tool feeding in ultrasonic machining which can be used without an operator in constant attendance; after the overbalance force (defined below) is determined, a machine can run unattended for long cuts. The tool feed rate is self adjusting; as the rate of material removal in a vertical direction changes, the rate of feed of the tool also changes to a suitable value. In addition to forming cavities in a vertical direction, ultrasonic machining in accordance with this invention may be used for horizontal cuts and more complex work. Horizontal movement of the workpiece must be started before the tool moves vertically into a cavity formed by itself. A workpiece may be placed on an X-Y table for scrolling or the ultrasonic machining apparatus may be horizontally movable. This invention has been used in accurately cutting very delicate materials, such as a sheet of glass which is 0.006 in. (0.152 mm) thick. The overbalance force is repeatable; once it is determined for a particular type of cut, the same value can be used for a similar cut. Also, practice of the invention permits higher cut rates and results in a reduced rate of tool wear.

Following is a description of apparatus which may be used in practising the present invention. However, the invention may also be practised with apparatus differing from that described. Those skilled in the art are aware that there are many configurations of ultrasonic machining apparatus and will understand, from the following description, how to adapt that apparatus for the practice of this invention.

Figure 1:
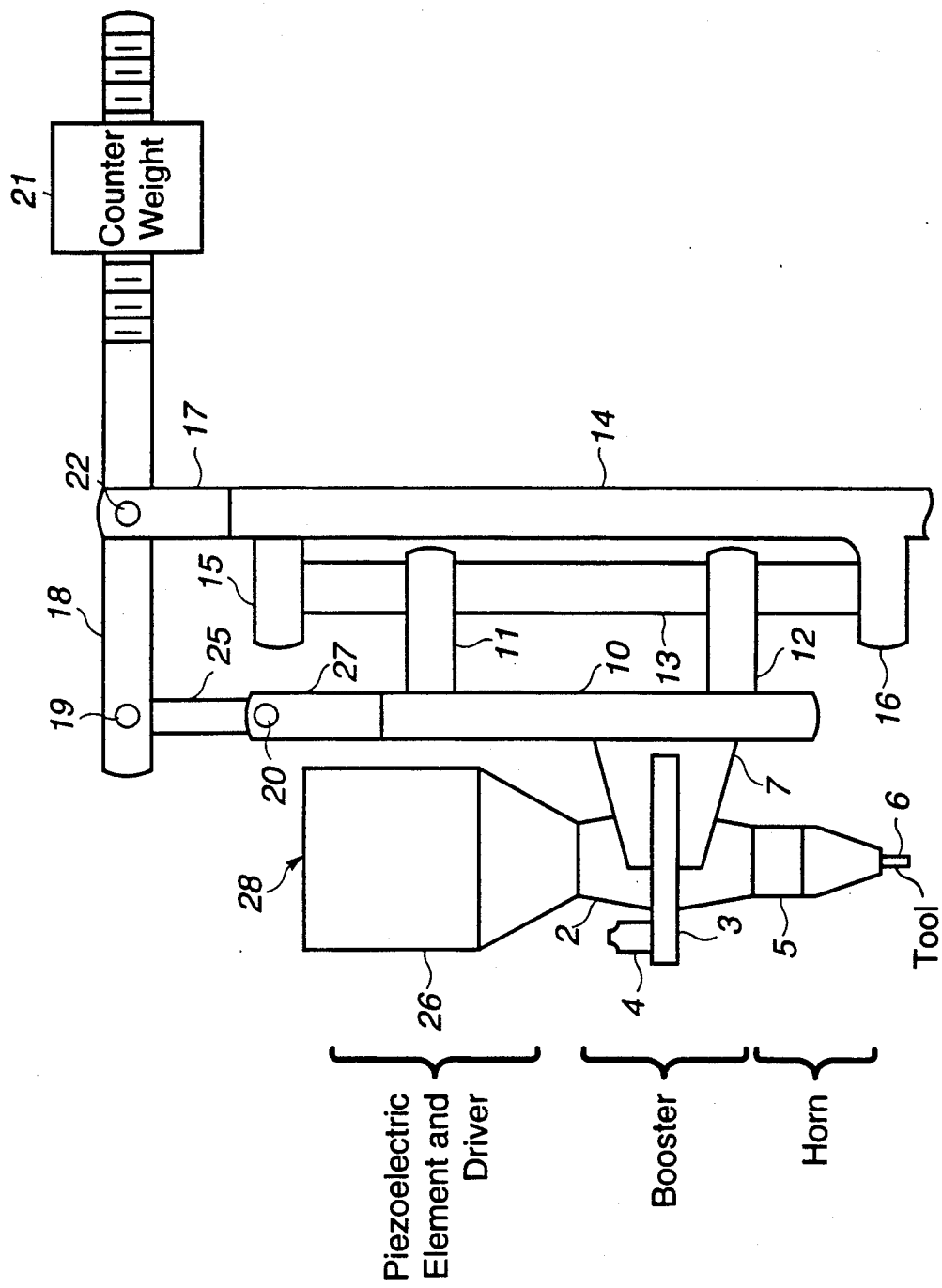
FIG. 1 is a side view of apparatus for ultrasonic machining. A tool assembly comprised of a piezoelectric element and driver, booster, horn, and tool is depicted. Also shown is apparatus for support of the tool assembly which allows the tool assembly to move in a vertical direction.
Figure 2:
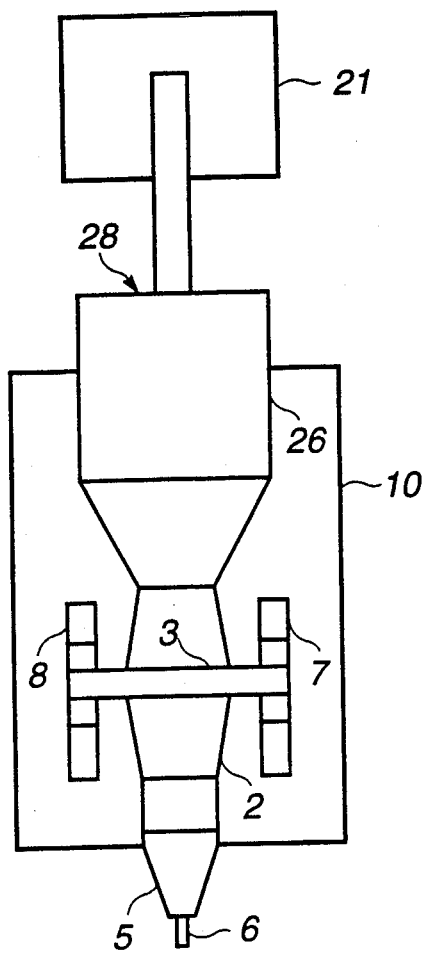
FIG. 2 is a front view of the apparatus of FIG. 1 with a portion of the apparatus behind the tool assembly omitted.

Referring now to FIG. 1, ultrasonic machining apparatus is mounted on pedestal 14, which is attached to a base which rests on a workbench (not shown) or is directly attached to a workbench (not shown). Referring also to FIG. 2, tool assembly 28 can be seen in both drawings and consists of piezoelectric element and driver 26, booster 2 with flange 3 attached to it, horn 5, and tool 6. Tool assembly mounting plate 10 has ball slide brackets 11 and 12 attached to it. Two additional ball slide brackets are attached to tool assembly mounting plate 10 but cannot be seen in FIG. 1 because they are directly behind ball slide brackets 11 and 12. Ball slide brackets 11 and 12 are attached to slide upright 13, which is supported between slide upright support brackets 15 and 16. Slide upright support brackets 15 and 16 are a part of, or are attached to, pedestal 14. A second slide upright and its associated slide upright support brackets are located behind slide upright 13 and slide upright support brackets 15 and 16 in FIG. 1 and therefore cannot be seen in FIG. 1. Tool assembly mounting plate 10 is affixed to the two slide uprights by means of the four ball slide brackets and is movable in a vertical direction, with travel limits being established by the slide upright support brackets. The ball slide brackets are designed such that there is relatively little frictional force generated when the ball slide brackets are moved along the slide uprights. There are many other equipment configurations which may be used which permit vertical movement of a tool assembly with a relatively small amount of applied force.

Counterweight support bracket 17 is attached to the top of pedestal 14 and supports counterweight arm 18 by means of counterweight arm pivot point 22. Counterweight 21 is attached to counterweight arm 18 by means of male threads machined on the arm and female threads inside a hole bored through the weight. The weight may be moved in a horizontal direction either closer to pedestal 14 or further away from pedestal 14 by rotating it. The end of counterweight arm 18 opposite weight 21 is attached to link 25 by means of pivot point 19. The lower end of link 25 is attached to bracket 27 by means of pivot point 20. Bracket 27 is attached to the top of mounting plate 10. Pivot points 19, 20, and 22 are designed to operate with a minimum of friction.

Tool assembly mounting brackets 7 and 8 are attached to tool assembly mounting plate 10 and are notched so that flange 3 may be supported by placing it into the notches on support brackets 7 and 8. Flange 3 is attached to the mounting brackets by means of set screws (not shown) or other convenient attachment means. Flange 3 is attached to booster 2 at a nodal (minimum vibration) point of axial motion to minimize loss of energy and transmission of energy to the support structure. Attached to the top of booster 2 is piezoelectric element and driver 26, which provides vibrational movement to booster 2. The piezoelectric element is connected by means of a power cable (not shown) to a power source (not shown). The power cable must be supported such that it does not add a variable weight to the tool assembly. The piezoelectric element converts electrical power to mechanical movement. Booster 2 may be used to change the amplitude of the vibration, which depends on the specific shape of booster 2. Acoustic horn 5 is attached to booster 2 and transmits the vertical motion to tool 6.

Figure 3:
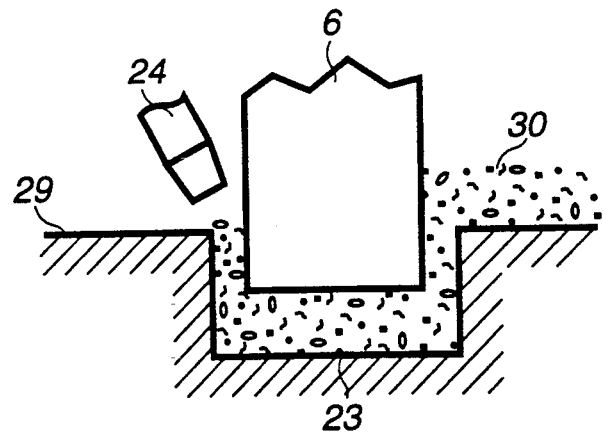
FIG. 3 depicts the working end of an ultrasonic machining tool in a cavity which has been cut by the tool and a nozzle which provides a slurry containing abrasive particles to a gap between the tool and the workpiece.

FIG. 3 depicts the lower end of tool 6 projecting into a cavity 23 in workpiece 29, which has been formed by ultrasonic machining using tool 6. Nozzle 24 is conveying a slurry containing abrasive particles 30 to the cavity. The vibration of tool 6, which is in a vertical direction, causes the particles of abrasive to vibrate in a vertical direction and impact workpiece 29, thus removing material from workpiece 29 to create cavity 23. The removed material is carried away by the slurry. The vibrating particles of abrasive below the tool exert a force on the bottom of the tool which may be termed grit energy reaction force and which tends to move tool assembly 28 vertically upward. In the practice of this invention, the grit energy reaction force maintains the gap between the tool and the workpiece. As material is removed from the workpiece, the grit energy reaction force decreases, allowing the tool to move downward to re-establish the gap at its original value, whereupon the grit energy reaction force increases. The vertical dimension of the gap remains substantially constant as material is removed.

In the practice of the invention, before the piezoelectric element is energized and before slurry flow out of nozzle 24 is started, counterweight 21 is adjusted so that tool 6 is immobile, or stationary, and positioned just above the workpiece. Then, the tool assembly is energized, slurry flow is started, and weight 4 is placed on flange 3. (Weight 4 is omitted from FIG. 3 for drawing convenience.) The magnitude of weight 4 is initially established by means of an estimate based on experience and depends on such factors as the slurry flow rate, the abrasive particle size and the size of tool 6. The magnitude of the downward force, which may be termed overbalance force, which is applied by means of weight placed on flange 3, is increased incrementally to the selected value so as to avoid causing the tool to contact the workpiece and the selected value is adjusted to obtain the optimum gap. After experience is gained, a machine operator is able to select the required weight (or force) with a great deal of accuracy. The vertical distance between the end of the tool and the surface of the workpiece from which material is to be removed (the gap) is usually from about 0.0005 to about 0.0025 in. (0.0127–0.0635 mm). The overbalance force is usually increased until the desired rate of material removal, or cutting rate, is obtained. The cut may then continue without need for constant attendance by the machine operator.

The overbalance force is related to the frictional force resulting from the downward movement of the tool assembly and the grit energy reaction force (the upward force on the tool resulting from the impacts of the particles of abrasive on the tool). The overbalance force must not be so great as to cause the tool to contact the workpiece but must be great enough to cause material to be removed from the workpiece. A maximum material removal rate can be obtained by increasing overbalance force until slurry flow is substantially impeded, at which point the material removal rate starts decreasing.

While it is convenient to explain the operation of this invention in terms of the force due to the use of weight 4, there are numerous other methods of applying the necessary downward force to the tool and these methods are included within the scope of the claims. For example, the adjustable counterweight described above may be adjusted to immobilize the tool assembly and then adjusted further to provide the required downward force. Other methods include the use of springs or fluid pressure.

It is desirable that frictional force associated with initiating and maintaining movement of the tool assembly be relatively small in magnitude in comparison to the other forces acting on the tool assembly and that frictional force be uniform throughout the tool assembly travel. Those skilled in the art of machining apparatus and its design know that movable tool assemblies, even those of massive size, must be movable with a small amount of frictional force in order that machining work of acceptable precision be accomplished. Further, those skilled in the art are able to design massive tool assemblies which can be moved by means of force applied by fingertips. The force required to initiate movement of the tool assembly should not be large relative to the force required for maintain movement. Otherwise, it is possible that the tool will contact the workpiece upon the start of machining and precautions will have to be taken to avoid contact. If the force needed to maintain tool assembly movement is large relative to the grit energy reaction force, it will be difficult to do precision machining work because changes in the grit energy reaction force will not influence tool position to the extent they would if the downward force required to overcome frictional force were not so large.

As used herein, force is defined as that which changes the state of rest or motion of an object. References to force herein are to be construed in the normal manner as a magnitude of a force. Frictional force is a force associated with bodies in contact with one another which resists movement of one body with respect to the other.

The foregoing description of the invention is not intended to be exhaustive or to limit the invention to the precise form disclosed and many modifications and variations are possible.

What is claimed is:

1. A method of ultrasonic machining comprising:
   a. providing ultrasonic machining apparatus having an ultrasonic machining tool mounted in a tool assembly and disposed such that said tool assembly is movable in a vertical direction and a relatively small amount of force is required to overcome frictional force associated with vertical movement of said tool assembly;
   b. directing a slurry stream comprised of abrasive particles in a liquid to a location on a workpiece from which material is removed by means of said tool and said abrasive particles;
   c. providing adjustable counterbalance means effective to immobilize the tool assembly in its vertical travel when the tool is not vibrating; and
   d. providing a force acting vertically downward on the tool assembly which is effective to cause downward movement of the tool assembly so that the tool is spaced apart from said workpiece by a vertical gap of such size that material is removed from the workpiece, where said downward force is less than a force which is effective to cause the tool to contact the workpiece.

2. The method of claim 1 where said force acting vertically downward on the tool assembly is supplied by weight added to the tool assembly.

3. The method of claim 1 where said force acting vertically downward on the tool assembly is supplied by spring means.

4. The method of claim 1 where said force acting vertically downward on the tool assembly is equivalent to weight added to the tool assembly in an amount ranging from about 5 to about 2000 gm.

5. The method of claim 1 where said vertical gap between the tool and the workpiece when material is being removed from the workpiece is from about 0.0005 to about 0.0025 in. (0.0127–0.0635 mm).

6. The method of claim 1 where said abrasive particles are chosen from a group comprising industrial diamond dust, boron carbide, silicon nitride, and silicon carbide.

7. The method of claim 1 where said abrasive particles have a size of from about 8 to about 66 microns.

* * * * *